(12) United States Patent
Copass et al.

(10) Patent No.: US 9,134,971 B2
(45) Date of Patent: Sep. 15, 2015

(54) EXTENSIBLE DEVICE OBJECT MODEL

(75) Inventors: Benjamin J. Copass, Mequon, WI (US); Michael R. Keller, Menomonee Falls, WI (US); Michael L. Stegemeyer, Oak Creek, WI (US); James S. Rustad, Jackson, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1064 days.

(21) Appl. No.: 12/893,680

(22) Filed: Sep. 29, 2010

(65) Prior Publication Data
US 2012/0079461 A1 Mar. 29, 2012

(51) Int. Cl.
*G06F 9/44* (2006.01)
*G05B 19/042* (2006.01)

(52) U.S. Cl.
CPC .............. *G06F 8/36* (2013.01); *G05B 19/0426* (2013.01); *G06F 8/30* (2013.01)

(58) Field of Classification Search
None
See application file for complete search history.

(56) References Cited

U.S. PATENT DOCUMENTS

| | | | |
|---|---|---|---|
| 5,842,020 A * | 11/1998 | Faustini | 717/111 |
| 6,226,788 B1 * | 5/2001 | Schoening et al. | 717/107 |
| 6,317,748 B1 * | 11/2001 | Menzies et al. | 1/1 |
| 6,405,366 B1 * | 6/2002 | Lorenz et al. | 717/107 |
| 6,609,133 B2 * | 8/2003 | Ng et al. | 1/1 |
| 6,981,266 B1 * | 12/2005 | An et al. | 719/316 |
| 6,990,652 B1 * | 1/2006 | Parthasarathy et al. | 717/107 |
| 7,043,738 B2 * | 5/2006 | Mandal et al. | 719/328 |
| 7,047,254 B2 * | 5/2006 | Daggett | 717/108 |
| 7,275,235 B2 * | 9/2007 | Molinari et al. | 717/100 |
| 7,543,276 B2 * | 6/2009 | Pfander et al. | 717/125 |
| 8,347,264 B2 * | 1/2013 | Chouinard et al. | 717/107 |
| 2002/0184401 A1 * | 12/2002 | Kadel et al. | 709/315 |
| 2003/0033437 A1 * | 2/2003 | Fischer et al. | 709/310 |
| 2003/0055948 A1 * | 3/2003 | Wang | 709/224 |
| 2003/0172088 A1 * | 9/2003 | Mandal et al. | 707/200 |
| 2005/0138040 A1 * | 6/2005 | Lamb et al. | 707/100 |
| 2006/0271911 A1 * | 11/2006 | Palapudi et al. | 717/106 |
| 2007/0226232 A1 * | 9/2007 | Yin et al. | 707/100 |
| 2007/0256080 A1 * | 11/2007 | Smith et al. | 719/313 |
| 2008/0028058 A1 * | 1/2008 | Shaw et al. | 709/223 |

OTHER PUBLICATIONS

DMTF CIM Schema—Devices Model <http://www.wbemsolutions.com/tutorials/CIM/cim-model-dev.html> Copyright 2002-2003, as archived by the "WayBack Machine" Internet Archive project on Nov. 11, 2006.*
DMTF CIM Schema—Physical Model <http://www.wbemsolutions.com/tutorials/CIM/cim-model-phys.html> Copyright 2002-2003, as archived by the "WayBack Machine" Internet Archive project on Sep. 20, 2003.*
Unpublished U.S. Appl. No. 12/507,906, filed Jul. 23, 2009, titled 'Intelligent Device Framework'.

* cited by examiner

*Primary Examiner* — Jason Mitchell
(74) *Attorney, Agent, or Firm* — Amin, Turocy & Watson, LLP

(57) ABSTRACT

Systems and/or methods are provided relating to an extensible framework. The extensible framework provides constructs with which device developers can model devices within the framework to enable a host application utilizing the framework to interact with the devices. New devices can be supported by the framework without disrupting existing devices or the host application.

20 Claims, 13 Drawing Sheets

EXTENSIBLE DEVICE OBJECT MODEL

TECHNICAL FIELD

The subject disclosure relates to an extensible device object model for industrial automation environments, and more particularly, to a model that supports data, features, communications, and structural constructs of a diverse set of devices in automation control systems such that support for new devices, features, communications, etc. can be added without disrupting host software applications employing the model.

BACKGROUND

In a typically control system, it is desirable to possess an ability to configure and program various devices within the control system. One way, to provide the ability to configure and program devices, is to employ a software application or tool. For instance, today many configurable components or devices of automation control systems are supported by a mixture of various device-specific, data-specific, and/or network-specific application tools.

Due to the inconvenience of utilizing multiple disparate tools to configure and control various devices, attempts have been made to fully integrate devices into control, engineering, and/or asset management systems. One such attempt involves hard coding device specific knowledge into a host software application. Thus, the host software application has explicit knowledge of all details related to a data model, feature set, and communications supported by each device.

Another attempt is FDT/DTM, which is a standard for organizing interfaces between a software tool and software (e.g., firmware) associated with a device. A standardized interface can be provided by a Field Device Tool (FDT) and a device developer employs Device Type Manager (DTM) to enable access to the device via the standard FDT interface. With FDT/DTM, functionality of a device, with respect to a software application accessing the device, is determined by a manufacturer of the device. The ability to add new functionality associated with a device rests solely with the device manufacturer. In addition, the presentation of device functionality is determined by DTM and a user interface adheres to a DTM style guide.

Another standard is Electronic Device Description Language (EDDL). For each device, there is a specific electronic device description (EDD) corresponding therewith that specifies functions associated with the device. Device functionality, however, is restricted to functions expressed in the standard. Additional functionality requires proprietary plug-ins.

As is evident from the above descriptions, hard coding device specific knowledge into host software applications requires redevelopment of the host software applications as new classes and/or new versions of device are released. FDT/DTM requires device manufacturers to conform to a specific standard interface. Additional functions and/or features need to be accessible via the standard interface, thus, limiting design of new features. With EDDL, device manufacturers are restricted to a set of standardized functions and structures.

SUMMARY

The following presents a simplified summary of the innovation in order to provide a basic understanding of some aspects described herein. This summary is not an extensive overview of the disclosed subject matter. It is intended to neither identify key or critical elements of the disclosed subject matter nor delineate the scope of the subject innovation. Its sole purpose is to present some concepts of the disclosed subject matter in a simplified form as a prelude to the more detailed description that is presented later.

According to various aspects, an extensible framework is provided. The extensible framework provides constructs with which device developers can model devices within the framework to enable a host application utilizing the framework to interact with the devices. New devices can be supported by the framework without disrupting existing devices or the host application.

In an aspect, a plurality of nodes can be created within the extensible framework. The nodes can include one or more modules, wherein each module represents a device and/or a sub-component of a composite device represented by an entire node. Each module can include a plurality of data objects respectively configured to store data related to particular features of the device or sub-component associated with the module. In addition, the nodes can include a plurality of translators; each translator is respectively associated with each data object of the plurality of data objects. The translators are configured to convert data to/from a format associated with the device or sub-component to/from a format associated with a respective data object. Further, the nodes include a plurality of connections that couple the translators to the device and are configured to shuttle data therebetween.

In another aspect, a mapping description is provided that includes metadata for devices to be represented within the extensible framework. The mapping description, for a given device, specifies a set of data objects, a set of translators, and/or a set of connections that can be employed to instantiate nodes in the framework capable of interfacing with the device. The extensible framework can employ the mapping description to construct new nodes for new devices without impacting existing nodes and devices, or the host application.

The following description and the annexed drawings set forth in detail certain illustrative aspects of the disclosed subject matter. These aspects are indicative, however, of but a few of the various ways in which the principles of the innovation may be employed and the disclosed subject matter is intended to include all such aspects and their equivalents. Other advantages and distinctive features of the disclosed subject matter will become apparent from the following detailed description of the innovation when considered in conjunction with the drawings.

DETAILED DESCRIPTION

Figure 1:
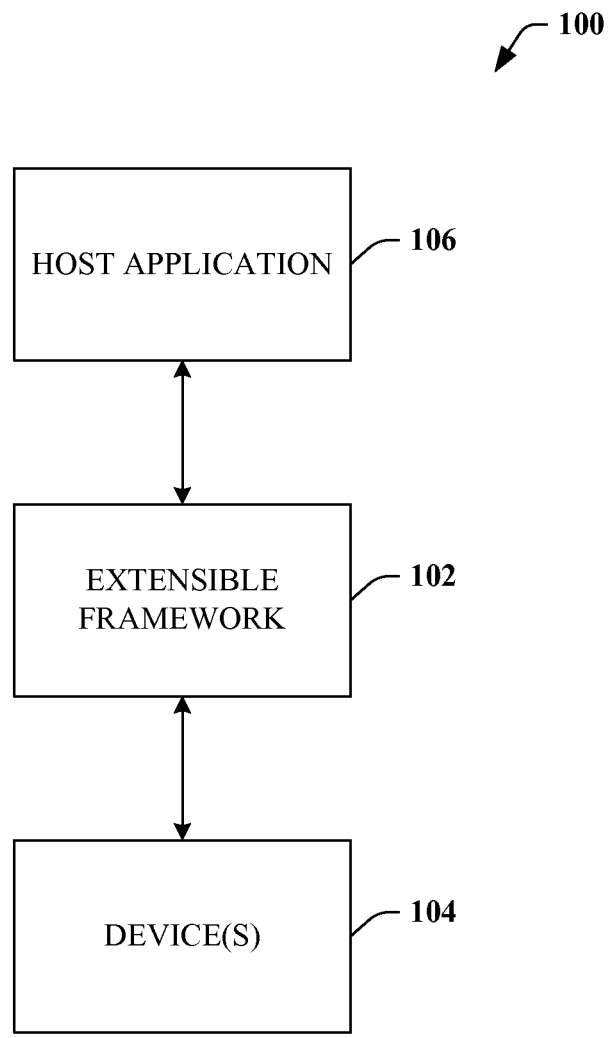
FIG. 1 illustrates a high-level block diagram of an example system that employs an extensible framework to provide configuration and addition of devices in accordance with various aspects.

Systems and/or methods are presented that provide mechanisms by which devices can be supported in a host software application in a manner that facilitates addition of new devices, features, and/or communication types without impacting the host software application. In addition, mechanisms are provided that facilitate supporting new devices, device types, features, and/or communication types without impacting design or implementation of existing devices. Further, mechanisms are provided that enable support of a diverse set of device types, data models, features, and communication methods within a context of a single host application.

A model and an associated framework are provided to represent devices within a host application. The model and framework provide abstract representations of devices, abstract mechanisms for associating data, features and communication methods of devices, and mechanisms for managing and accessing devices to enable a graphical user interface (GUI) component or host application to interact with the devices. The framework supports devices with varying data model representations (e.g., EDDL, EDS, device specific, etc.), varying sets of device-level features (e.g., parametric configuration, language-based programming, trending, diagnostics, etc.), and varying types of communication (e.g., EtherNet, DeviceNet, Serial, etc.).

Various embodiments are now described with reference to the drawings, wherein like reference numerals are used to refer to like elements throughout. In the following description, for purposes of explanation, numerous specific details are set forth in order to provide a thorough understanding of one or more embodiments. It will be evident, however, that such embodiment(s) can be practiced without these specific details. In other instances, well-known structures and devices are shown in block diagram form in order to facilitate describing one or more embodiments.

Referring initially to FIG. 1, illustrated is a system 100 that employs a framework to provide configuration and addition of devices in accordance with various aspects. System 100 includes an extensible framework 102 which couples a set of devices 104 to a host application 106. The extensible framework 102 exposes representations of devices in the set of device 104 to the host application 106. In particular, the extensible framework 102 generates abstract representations of devices 104, abstractly associates data, features, and communication methods of devices 104, and manages access to devices 104 to enable the host application 106 to interact with devices 104.

The extensible framework 102 is implemented in a highly componentized fashion to enable new device and/or features to be accessible within the host application 106 without modification of an installation of the host application 106. In an example, new features and/or devices can be added by including a new component into the extensible framework 102. As described in further detail below, the new components can be created by device developers. The extensible framework 102 can automatically assemble the new components to enable a communication pathway and/or coupling in accordance with a model implemented by the framework 102. In addition, new features and/or device can be represented within the extensible framework 102 through reuse of existing components. Accordingly, when a new device is released and/or features are added to an existing device, support of the new device and/or features can be added after installation of the host application 106 such that the host application 106 can seamlessly access and manipulate the new devices and/or features.

According to a further aspect, the extensible framework 102 is not tied to any particular data model or communication model associated with the set of device 104. In addition, the extensible framework 102 operates independent of any particular GUI model or host application design. Accordingly, the extensible framework 102 can generate abstract representations of devices within a wide variety of environments. For example, extensible framework 102 can be employed to abstract field devices, drives, controllers, sensors, etc., in an industrial automation environment. However, it is to be appreciated that extensible framework 102 can operate with other suitable devices of other environments which can be abstracted to provide access to the devices from an application. Further, it is contemplated that the claims appended hereto are not limited to devices in an industrial automation environment as it is intended that the subject claims encompass alternative environments (e.g., hardware components of a computer system, device drivers, security systems, etc.).

According to a further aspect, host application 106 can utilize the extensible framework 102 in a variety of manners. For instance, the host application 106 can leverage the extensible framework 102 to populate a user interface with data from the set of devices 104 to enable an operator to observe and monitor operation of the set of devices. In another example, the host application 106 can provide interfaces to configure, program, and/or manipulate the set of devices 104.

The host application 106 can be developed independently from the extensible framework 102 and the set of devices 104. The set of device 104 can be designed and developed by a plurality of device manufacturers. The host application 106 can be developed by a customer of the manufacturers or some other consuming entity of the set of devices 104. The customer or consuming entity can utilize the extensible framework 102 to facilitate development of the host application 106 in order to leverage the extensibility and flexibility of the framework 102

Figure 2:
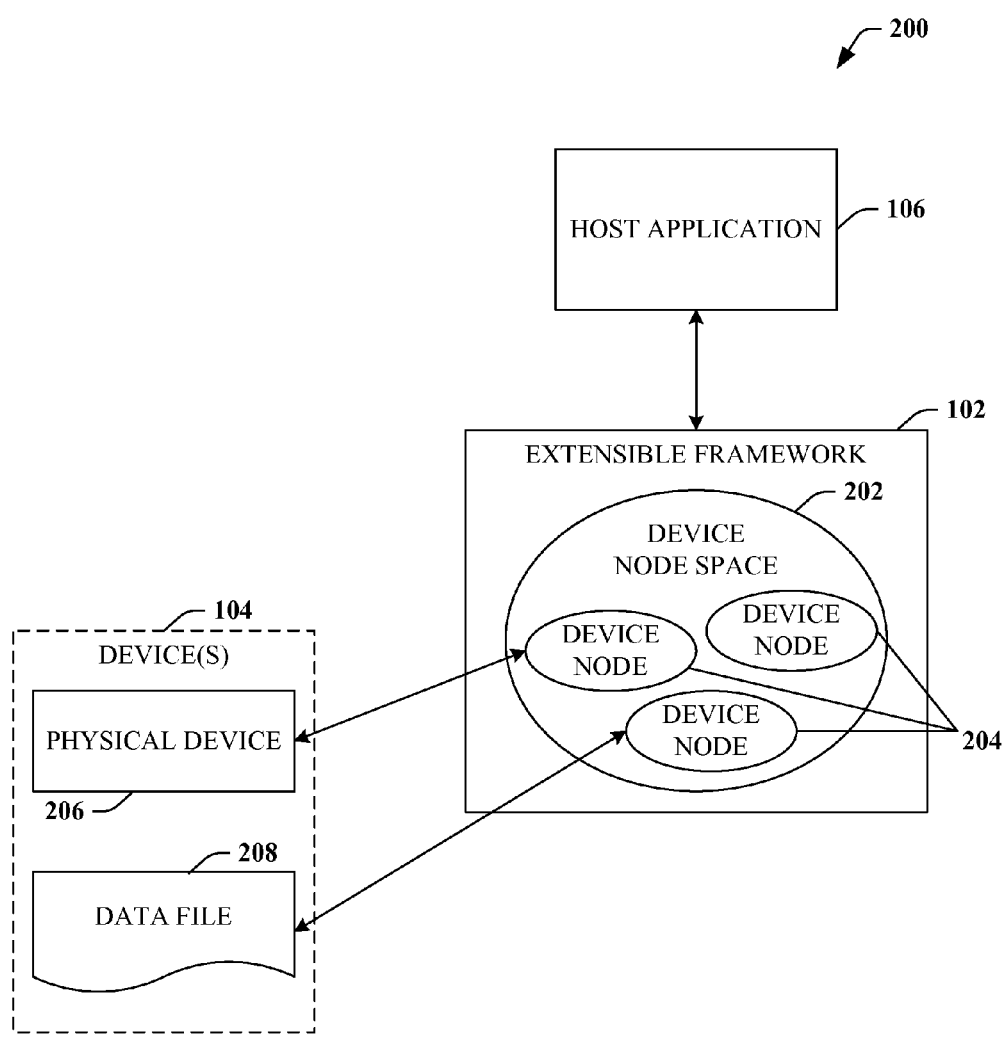
FIG. 2 illustrates an example system in which a host application employs an extensible framework to interact with representations of device in accordance with various aspects.

FIG. 2 illustrates a system 200 in which a host application employs an extensible framework to interact with representations of device in accordance with various aspects. As shown in FIG. 2, system 200 can include the extensible framework 102, the set of devices 104, and the host application 106, as described above with respect to FIG. 1.

In one aspect, the host application 106 can be a software application that provides functionality related to an environment. For example, system 200 can be deployed in or be a portion of an industrial automation control system such that host application provides a set of functionality related to the control system. The host application 106 can include a GUI of various features, data, and/or tools available within the control system. The host application 106, when required to interact with one or more devices in the set of devices 104, can access the extensible framework 102.

The extensible framework 102 can provide mechanisms for managing devices 104 to enable the host application 106 to access, manage, and interact with the device 104. The extensible framework 102 can include a device node space 202, which is an abstract space that contains nodes. Device node space 202 is described in further detail below. Within the device node space 202 is one or more device nodes 204. While three device nodes are illustrated in FIG. 2, it is to be appreciated that device node space 202 of the extensible framework 102 can include any number of device nodes 204, greater than or equal to zero.

In accordance with an aspect, each device node 204 can abstractly represent one or more devices from the set of device 104. Host application 106 can access the device nodes 204 to interact with the actual devices 104 associated therewith. The set of device 104 can include physical devices such as physical device 206 and data files such as data file 208. Physical device 206 can be a hardware device, a computer system, etc. In accordance with the example above, wherein the system 200 is deployed in an automation control system, physical device 206 can be a field device, a sensor, a drive, a controller, a machine, a robot, or the like. The physical device 206 can be coupled to a communication network such as, but not limited to, an EtherNet network, an IP network, ControlNet, DeviceNet, etc. Data file 208 can be a file stored on a computer-readable storage medium (e.g., a memory, a disk, etc.). Further to the automation control system example, data file 208 can be a data sink that logs or stores real-time data from one or more physical devices. Data file 208, in turn, acts as a data source within the context of extensible framework 102.

The extensible framework 102 establishes connections between devices nodes 204 and devices 104. Device nodes 204 and devices 104 can communicate via a variety of connections. For instance, a connection between device node 204 and physical device 206 can be a communication connection via a network (e.g., an IP connection (TCP, UDP, . . . ), a DeviceNet connection, a ControlNet connection, a serial connection, or the like) or other communication media (e.g., WiFi, cellular communications, infrared, near-field communications, or the like). In addition, it is to be appreciated that the communication connection can extend across a plurality of disparate networks. For instance, a computer hosting the extensible framework 102 can be coupled to a computer network such as a LAN, a WAN, the Internet, etc., while the physical device 206 resides on a control system network such as DeviceNet. Accordingly, the communication connection established by the extensible framework 102 can include the computer network, the control system network, as well as any bridge device (e.g., router, gateway, etc.) that links the computer network to the control system network.

A connection between device node 204 and data file 208 can be a file association, for example. However, the connection between device node 204 and data file 208 can encompass other mechanisms beyond file associations. For instance, the connection can be a socket, a file descriptor, a file handle, etc.

The host application 106 can interact with devices 104 via the extensible framework 102 in accordance with a variety of patterns. In one aspect, device nodes 204 can be populated with actual data from respective source devices 104. Devices 104 can push data to device nodes 204 and/or device nodes 204 can request or pull data from devices 104. The data can be communicated to device nodes 204 via connections established between device nodes 204 and the devices 104.

In another aspect, device nodes 204 can expose a set of methods or functions that the host application 106 can call to retrieve data from devices 104 and/or access functionality of devices 104. The set of methods can include mechanisms by which portions of data are retrieved from and/or portions of data or commands are pushed to devices 104 via associated connections established between the device nodes 204 and the devices 104.

Figure 3:
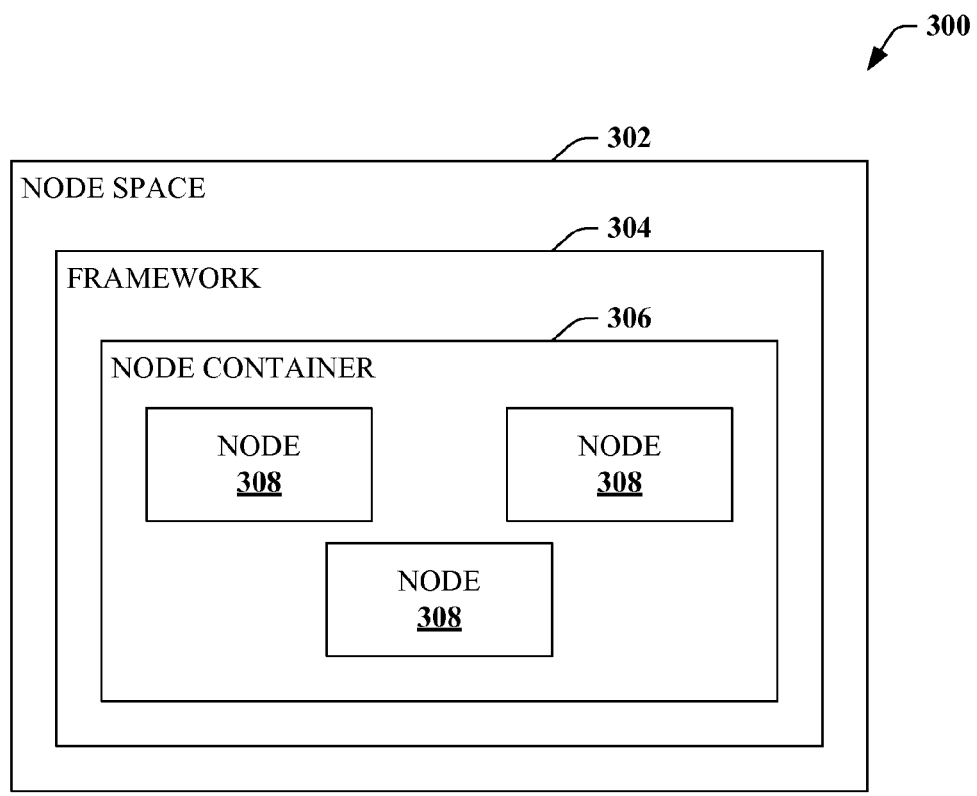
FIG. 3 illustrates a high-level block diagram of an abstract aggregation model that includes a node space according to one or more aspects.

Turning now to FIGS. 3-7, illustrated are example structures and concepts of an extensible framework, such as framework 102 described supra, in accordance with one or more aspects. It is to be appreciated that the structures, objects, and concepts detailed below present but one possible implementation of the extensible framework. Referring to FIG. 3, a high-level block diagram 300 of an abstract aggregation model that constitutes a node space in accordance to one or more aspects is illustrated. Diagram 300 depicts an organization of the extensible framework at a highest level of abstraction. At a top level, is a node space 302. Node space 302 represents a logical environment where device nodes (interchangeably referred to herein as nodes) are located. In an aspect, a relationship can associate or link node space 302, various nodes contained therein, and a user of node space 302. In one example, the node space 302 can represent an organizational model such as a project. The user of the node space 302 can collect nodes related to the project and store them in the node space 302. In another example, the node space 302 can represent a network, such that a mapping is defined between nodes and a physical node on the network. It is to be appreciated that node space 302 can comprise other logical representations that express a relationship between the node space 302, nodes, and/or the user of the node space 302. Accordingly, node space 302 can adopt any context desired by a user of the node space 302.

In another aspect, the node space 302 can leverage an abstract aggregate model, such that nodes are represented within an object space where each node (e.g., object) provides an aggregate representation at a level within node space 302. In accordance with an example, a device can be represented as a composite device, wherein the composite device is an aggregation of a complex structure of constituent parts. Constituent parts can include physical and/or virtual modules, the sum of which constitutes the aggregate or composite device.

Node space 302 can include a framework 304 that provides a container for nodes within node space 302. The framework 304 can provide mechanisms to manage and access nodes within the node space 302. Further depicted in diagram 300 is a node container 306 that stores nodes associated with the node space 302. In one aspect, node container 306 can be a container object owned by node space 302. In another aspect, node container 306 can be the node space 302, itself.

As depicted in FIG. 3, node container 306 can include one or more nodes 308. Nodes 308 can be logical representations of composite devices. In one aspect, nodes 308 do not carry an inherent context. For instance, nodes 308 can be in a context of a composite device in an application project organizational mode, a context of a physical node address on a network, etc. Nodes 308 can represent complex modules and/or simple devices. Nodes 308 can represent, within the extensible framework, devices, files, collections of devices, networks, sub-networks, etc. For instance, node 308 can represent an input/output (I/O) rack on a network, wherein the I/O rack includes a plurality of I/O modules (e.g., digital I/O modules, analog I/O modules, or the like). The modules can be represented within a structure of node 308 as described below. In another example, node 308 can represent a controller in an automation control system. Within node 308, various controller structures such as ladder programs, function block programs, I/O ports, message blocks, etc., can be modeled. In yet another example, node 308 can represent a drive such that structures within the node 308 model include parameters, program structures, I/O assembly blocks, etc. of the drive. Further, sensors can be represented by nodes 308 such that nodes 308 provide access to parameters of the sensors, inputs of the sensors, outputs of the sensors, etc.

Referring to FIGS. 4-7, example node structures within an extensible framework are described. The example node structures can be employed to implement nodes 308 and/or device nodes 204. In addition, these structures can be utilized to represent devices within the extensible framework. As will become evident, nodes in the extensible framework can have a simple structure or a complex structure depending on the requirements and/or features of a device modeled, and/or design considerations of a device developer. The extensible framework allows nodes to exhibit any design and does not require devices to be modeled according to any particular structure. In one aspect, a device developer can elect how a device is modeled within the extensible framework. The example structures described below provide building blocks upon which the device developer can model a device according to the needs and features of the device.

Figure 4:
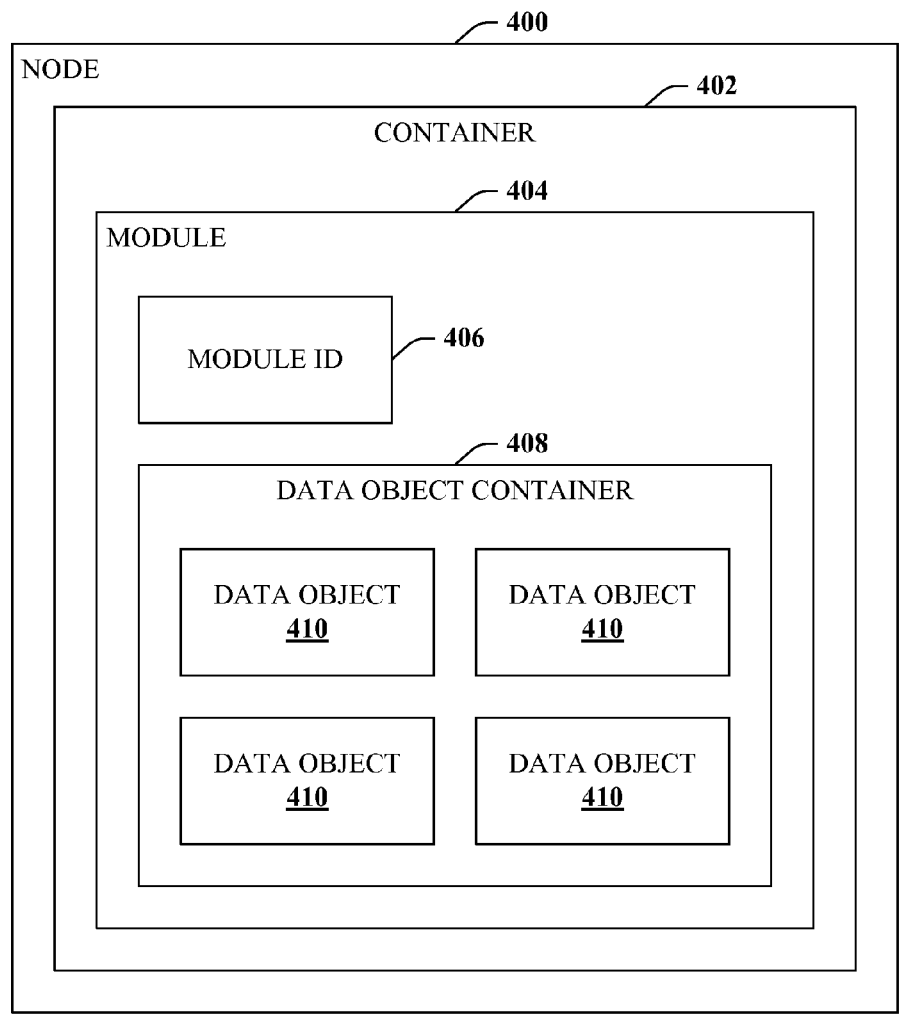
FIG. 4 illustrates a high-level block diagram of an example node within an extensible framework according to one or more aspects.

Turning to FIG. 4, illustrated is a node 400 within an extensible framework according to one or more aspects. In an aspect, node 400 can be a single node within a node space (e.g., node space 302). Node 400 can include a container 402, which is a mechanism to store structural element associated with a device, either a composite device or a singular device. One such structural element, according to an aspect, is a module 404.

Module 404 provides a logical representation of a device. In one example, the device can be a portion of a composite device represented by node 400. For instance, module 404 can represent a sub-component of a composite device (e.g., an I/O module of an I/O rack). In another example, the device can be a singular or simple device represented by node 400. Module 404 can be associated with a real device (e.g., a physical device) or a virtual device, such that module 404 is a logical representation of a set of functionality which may not be directly related to a physical device.

Module 404 can include a module ID 406 that stores identification information associated with module 404. The identification information can include information such as, but not limited to, a device type, a revision number, a name, or the like. Module 404 can further include a data object container 408 that retains data objects of module 404. As shown in FIG. 4, data object container 408 can include a set of data objects 410. Each data object 410 can store actual data associated with a specific feature, function, operation, etc. of the device represented by module 404. In addition, each data object 410 can expose methods to enable control of or interaction with various features and functions of the device. While FIG. 4 depicts a set of four data objects within module 404, it is to be appreciated that module 404 can include any number of data objects greater than or equal to one.

Figure 5:
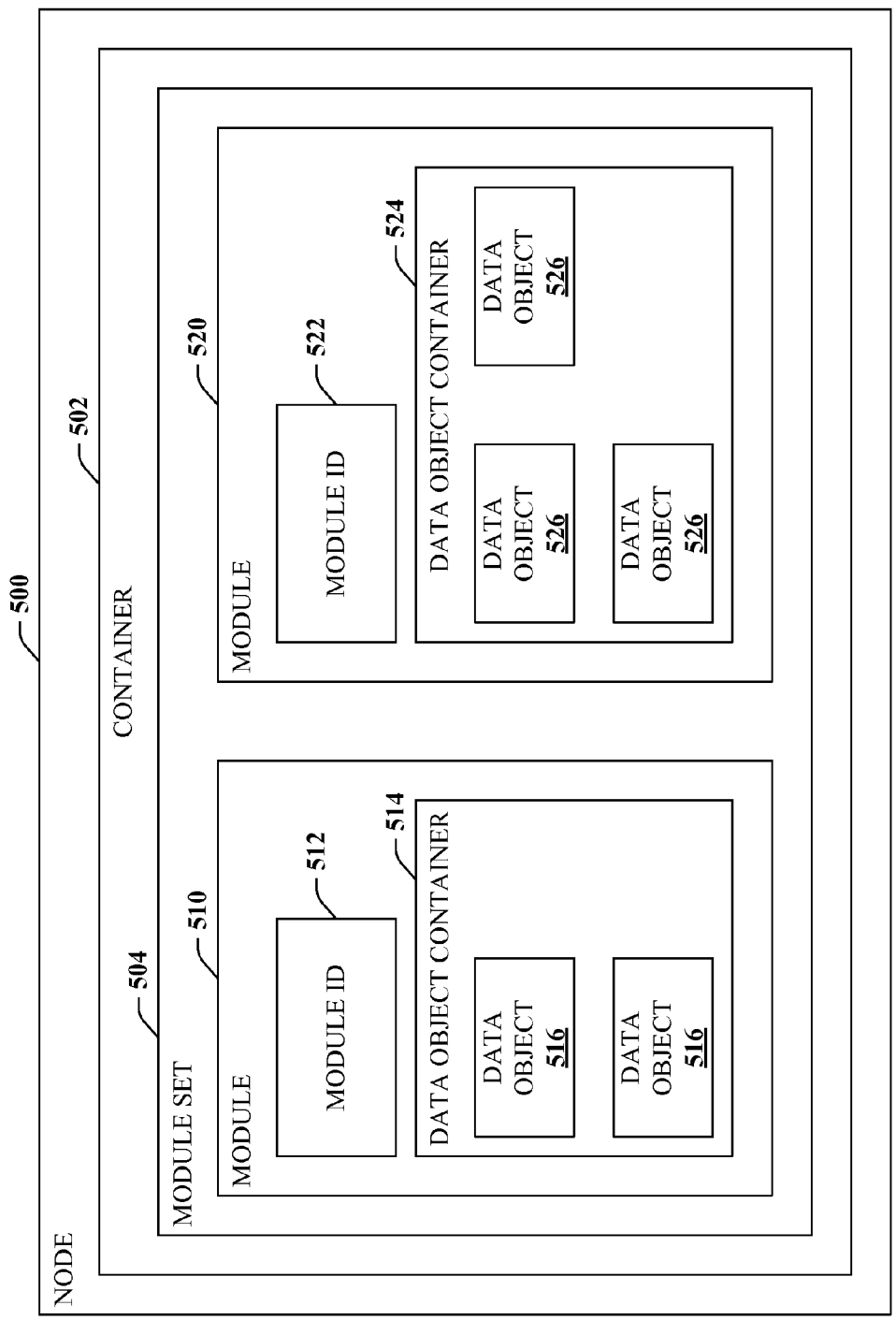
FIG. 5 illustrates a high-level block diagram of an example node within an extensible framework according to one or more aspects.

FIG. 5 illustrates another example node structure. As shown in FIG. 5, a node 500 is illustrated. Node 500 can include a container 502, which, similar to container 402, can retain structural elements associated with a device or composite device modeled by node 500.

In an aspect, another structural element beyond a module is a module set 504. Module set 504 can function as an organizational aid to facilitate embedding one or more levels of modules within a logical representation of a composite device. Module set 504 can contain modules, such as modules 510 and 520, and/or other module sets (not shown). As shown in FIG. 5, modules 510 and 520 can be similar to module 404 described above with respect to FIG. 4. For example, module 510 can include a module ID 512, a data object container 514, and a set of data objects 516. Similarly, module 520 can include a module ID 522, a data object container 524, and a set of objects 526.

Figure 6:
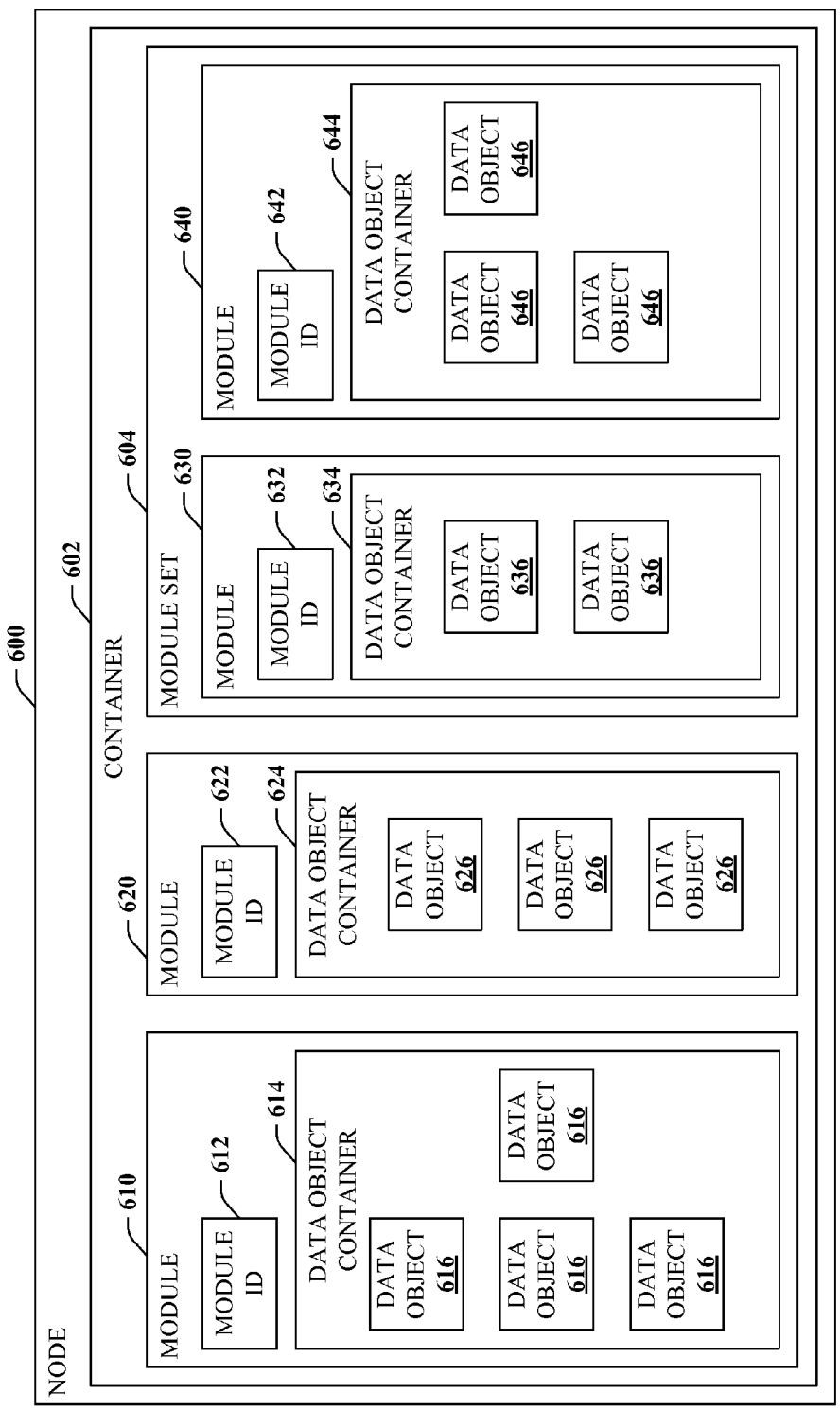
FIG. 6 illustrates a high-level block diagram of an example node within an extensible framework according to one or more aspects.

Turning to FIG. 6, yet another example node 600 is illustrated. Node 600 can include a container 602 that retains module 610, module 620, and a module set 604. Module set 604 can include module 630 and module 640. As shown in FIG. 6, modules 610, 620, 630, and 640 can include respective module IDs 612, 622, 632, and 642, respective data object containers 614, 624, 634, and 644, and respective data objects 616, 626, 636, and 646.

As illustrated in FIG. 6, a node can represent a complex composite device having multiple levels to model a hierarchy of sub-components. For example, node 600 can represent a rack device in an industrial automation device. Module 610 can represent a power supply sub-component of the rack device and module 620 can model a processing sub-component of the rack device. Module set 604, in turn, represents an I/O section of the rack device, wherein the I/O section includes a plurality of I/O modules represented by modules in module set 604, such as modules 630 and 640. A host application, employing the extensible framework, can access node 600 to interact with the rack device. For example, the host application can query data objects 616 to obtain related to the power supply sub-component. In addition, the host application can manage data objects 626 to modify, halt, and/or run control programs. Further, the host application can access data objects 636 and 646 to acquire information associated with various inputs and outputs of the rack device.

Figure 7:
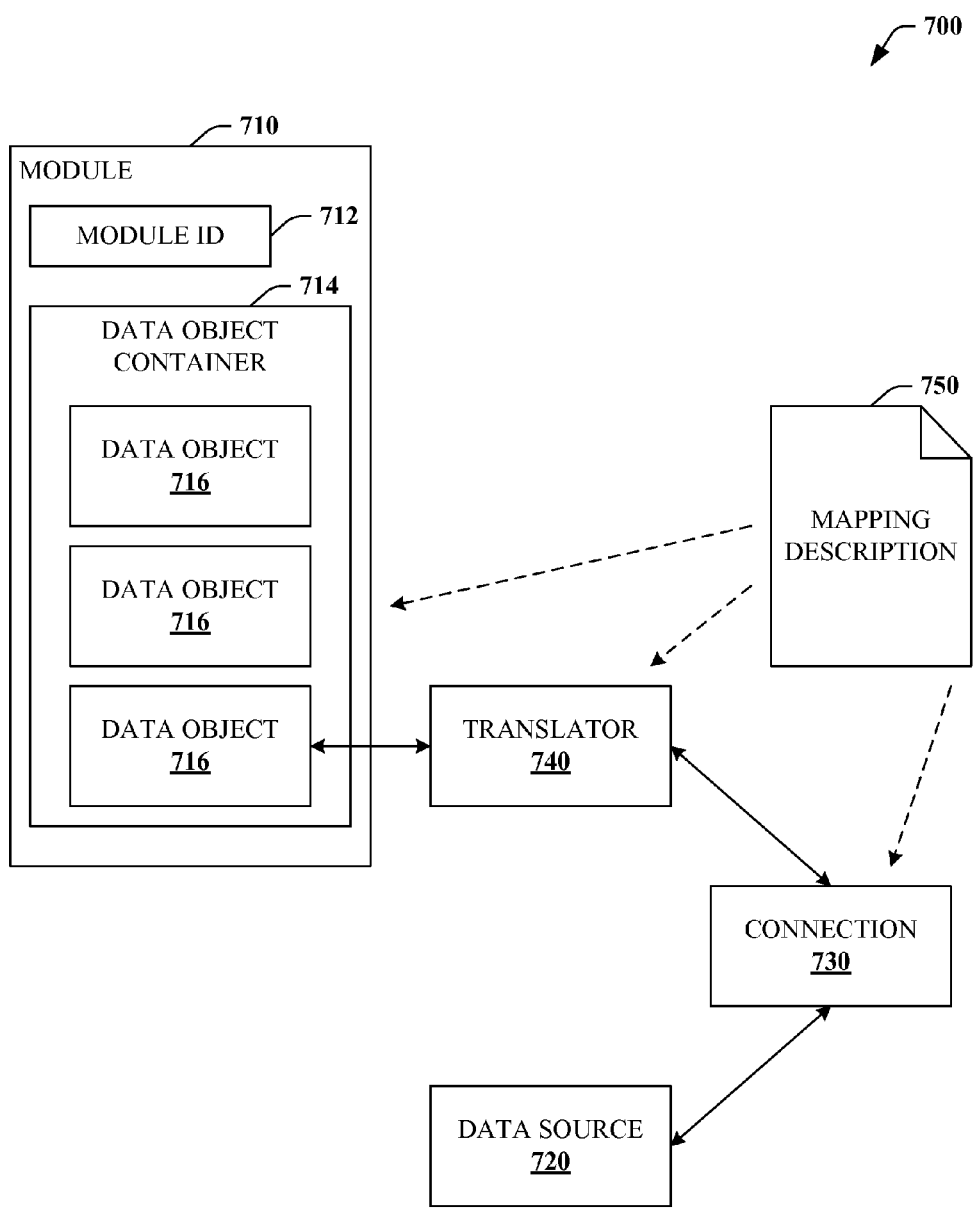
FIG. 7 illustrates a block diagram of an example system that couples a data source to a module within a node in an extensible framework in accordance with various aspects.

Turning now to FIG. 7, system 700 is illustrated that facilitates coupling a data source to a node in an extensible framework in accordance with various aspects. As depicted in FIG. 7, system 700 can include a module 710 similar to modules described above with respect to previous figures. Module 710 includes a module ID 712 that includes identification information associated with module 710, a data object container 714 that retains one or more data objects 716.

Module 710 can represent a device or a portion (sub-component) of a composite device. Within module 710 are one or more data objects 716. Data objects 716, in an example, exist within the extensible framework (on a software side), in a context of a host application. Data objects 716 can represent parameters, program structures, inputs, outputs, etc, associated with the device modeled by module 710. As such, data objects 716 require data from an actual source, such as data source 720. Data source 720 can be a physical hardware device on a network (e.g., computer network, control network, device network, etc.). In an example, module 710 can represent a controller, an I/O module, a drive, a sensor, a field device, etc., generating or sourcing real data. A portion of that real data can be associated with a particular feature, function, parameters, program, etc. of the device corresponding to data object 716. Accordingly, data object 716 obtains the portion of real data and retains the portion within the extensible framework and enables access to the portion of real data by a host application or other entity utilizing the extensible framework. However, it is to be appreciated that data source 720 can be a virtual device such as a data file, a data stream, etc.

System 700 implements a communication model by which data object 716 can obtain data generated by data source 720. System 700 includes a connection 730 that couples data source 720 to a translator 740. Connection 730 can be a pipe between data source 720 and translator 740 in that connection 730 provides transport of data without modification to the data. Connection 730 facilitates transport of data over a communication connection. The communication connection can be a network connection via a variety of communication media (e.g., wire, Ethernet, fiber optics, wireless, infrared, AC power lines, etc.). In another example, the communication connection established by connection 730 can be virtual connection such as an inter-process communication mechanism (e.g., a socket between applications, a shared memory space, etc.). Thus, connection 730 can employ one of a variety of transport mechanisms to support an exchange of data between data source 720 and translator 740.

Translator 740 facilitates coupling data source 720 to data object 716 via connection 730. In one aspect, translator 740 is configured to provide semantic translation of data exchanged between data object 716 and data source 720. Translator 740, in a downstream direction, can convert raw data from data source 720 into a format expected or suitable for data object 716. Similarly, translator 740, in an upstream direction, can format data from data object 716 into a form recognizable to data source 720.

While FIG. 7 depicts a single translator 740 coupled to a single connection 730, it is to be appreciated that the communication model implemented by system 700 can support a plurality of translators interconnected with a plurality of connections. For example, one connection, such as connection 730, can be associated with two or more translators. In addition, it is to be appreciated that translator 740 can operate with other connections beyond connection 730. In an aspect, connection 730 provides transparent transport of data between data source 720 and translator 740, such that translator 740 remains ignorant to the actual communications medium employed. Accordingly, connection 730 can be swapped with another connection employing a different communications medium without impacting translator 740 and/or data source 720. Accordingly, the communication model implemented by 700 enables data objects 716 to be decoupled from implementation specific and/or medium specific details of data transport to/from data source 720. Similarly, connection 730 can be decoupled from data objects 716, such that connection 730 needs only to transport data without consideration to formatting requirements.

System 700 further includes a mapping description 750 that associates data objects, translators, connections, and data sources. For example, a particular device can support multiple data objects and communicate via a variety of communications mediums and/or protocols. Mapping description 750 identifies which data object 716 within a module 710 is associated with each data object of the device. In addition, mapping description 750 identifies which translators 740 and connections 730 are to be used to transport data between data object 716 and data source 720. In a general sense, mapping description 750 includes metadata for a device that specifies a set of data objects that can be employed in a module, a set of translators that operate with the set of data objects, and a set of connections that operate with the translators and/or with protocols supported by the device.

Mapping description 750 can be an XML file. However, it is to be appreciated that mapping description 750 can convey metadata information in a variety formats in addition to XML, such as, but not limited to, HTML, text, binary, relational databases, etc. In addition, in one example, mapping description 750 can be unique to a particular device (e.g., each device has a corresponding mapping description). Accordingly, as new devices are released, new mapping descriptions are provided to the extensible framework. In another example, mapping description 750 can include metadata associated with a particular type of device, manufacturer of devices, class of device, etc. According to this example, as a new device is released, a corresponding mapping description need only to be extended to include metadata associated with the new device.

The framework described above with reference to FIGS. 3-7 provides flexibility and extensibility. A device developer can create a variety of data objects, translators, and/or connections necessary or desired to support a device within the framework. The framework operates as a gluing mechanism such that the device can be plugged into the framework and be immediately utilized by an entity employing the framework.

Figure 8:
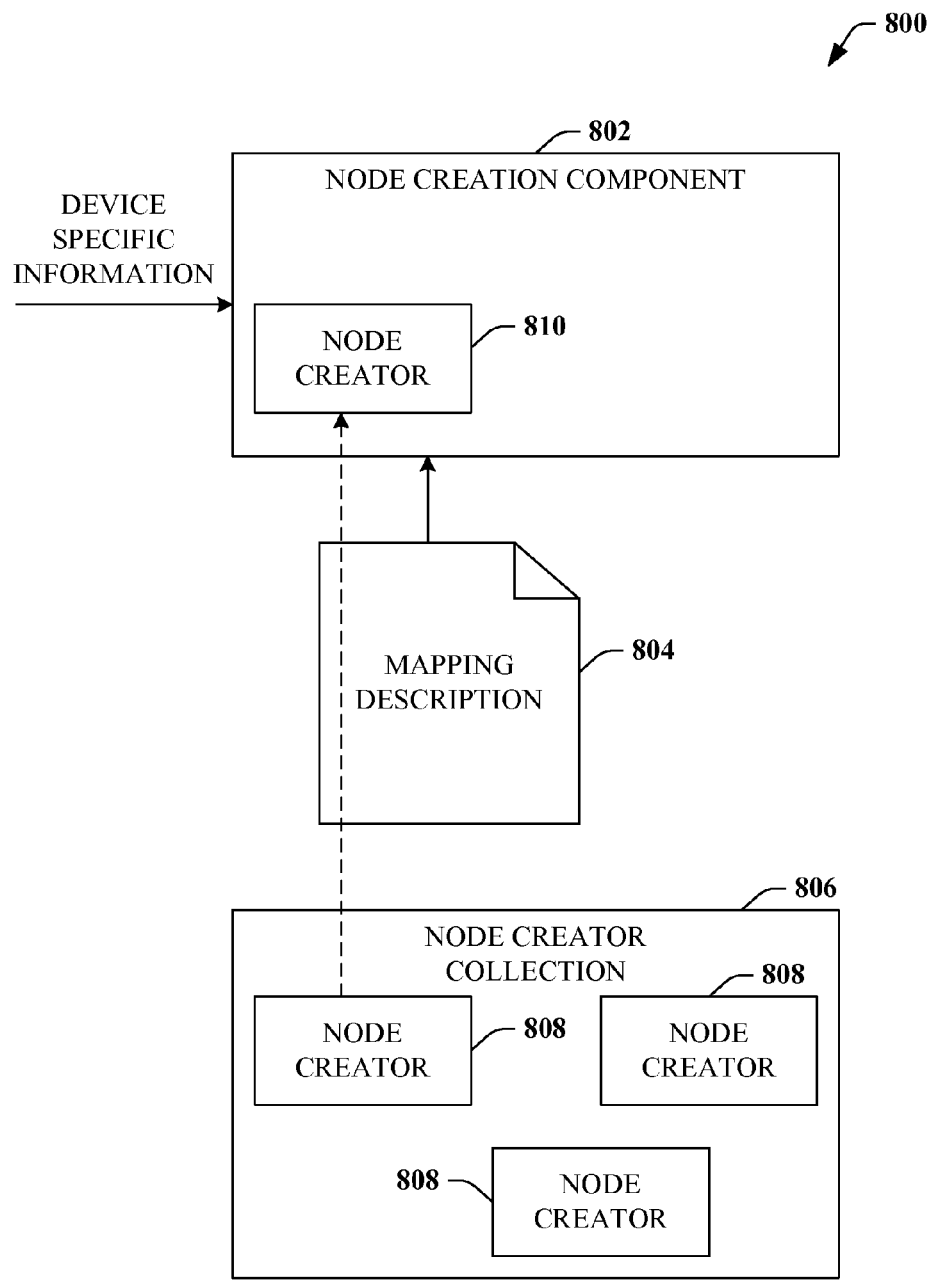
FIG. 8 illustrates a block diagram of an example system that facilities generation of a node within an extensible framework in accordance with various aspects.
Figure 9:
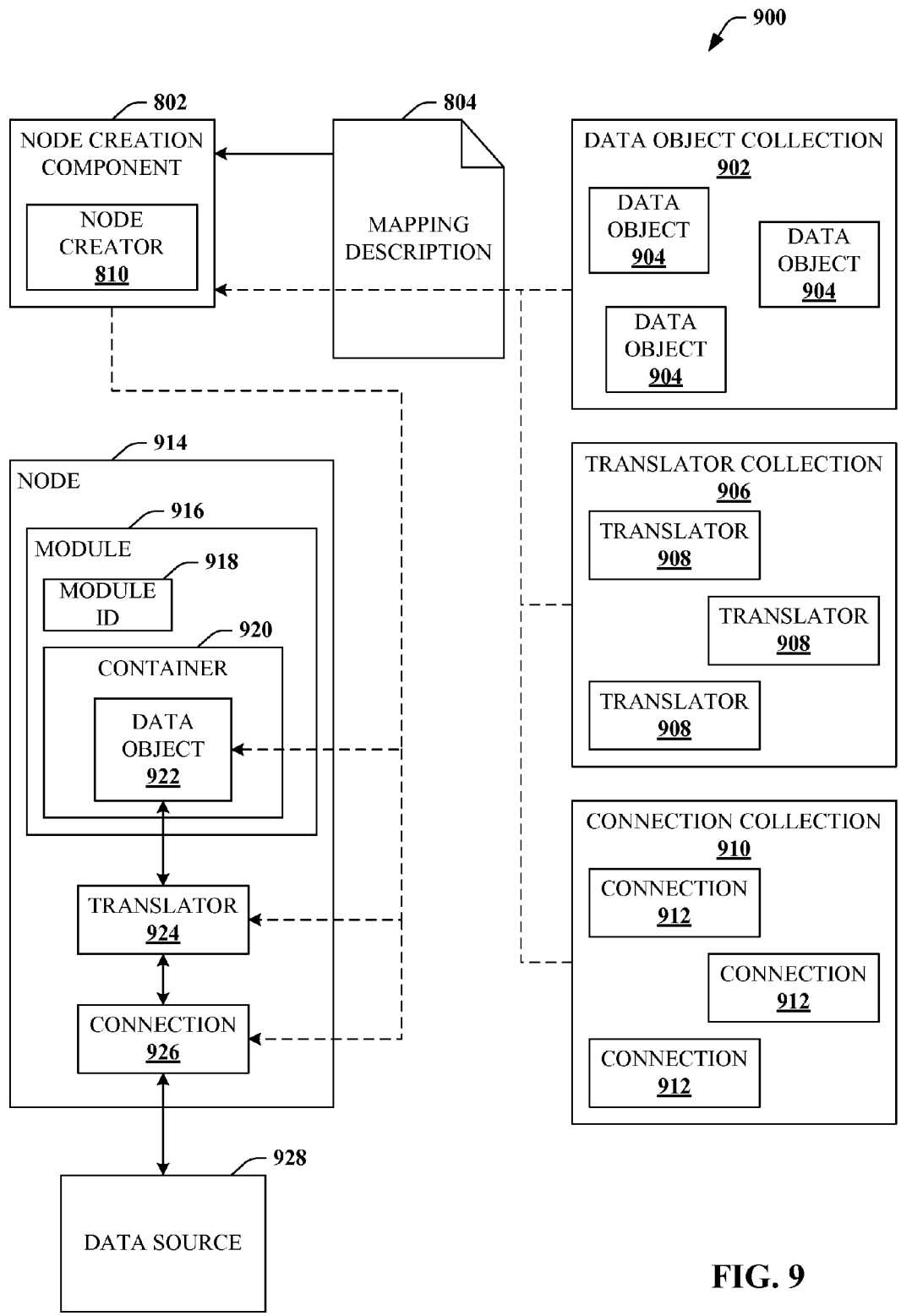
FIG. 9 illustrates a block diagram of an example system that facilities generation of a node within an extensible framework in accordance with various aspects.

FIGS. 8 and 9 illustrate mechanisms and/or methods by which devices can be modeled within the framework and instances of corresponding nodes can be created. Turning initially to FIG. 8, a system 800 is depicted that facilities generation of a node within an extensible framework in accordance with various aspects. System 800 illustrates an initial step of node creation and includes a node creation component 802. Node creation component 802 identifies a device to be modeled and represented by a node within the framework. Node creation component 802 obtains device specific information, which can facilitate identification of the device. The device specific information can include metadata information such as, but not limited to, a device identity, device class information, device type information, revision information, etc. The device specific information can be obtained from a catalogue mechanism, an online browsing mechanism, directly supplied by a user, or the like. In another aspect, the device specific information can be obtained from a host application. For instance, the host application can know the device (e.g., a controller, a CIP device on a DeviceNet network, a data file, etc.) the user wishes to instantiate in the framework. According to another example, the device specific information can include node type information and/or data source information. Node type information can be seed information indicating a type of node to instantiate, wherein the seed information can include device specific information. The data source information indicates a form of a data source that will be associated with data objects of the node.

Node creation component 802, based upon the device specific information, can select an appropriate mapping description 804 corresponding to the device. In an aspect, a data store (not shown) can retain a plurality of mapping descriptions associated with various devices, manufacturers, device types, etc. Node creation component 802 accesses the data store to obtain mapping description 804 based upon the device specific information. In another aspect, mapping description 804 can be a global map that provides metadata for all devices supported by the framework. According to this aspect, node creation component 802 employs the device specific information to identify an appropriate portion of or location within mapping description 804.

System 800 includes a node creator collection 806, which is a repository retaining available node creator 808 employable by the framework to instantiate nodes. Node creation component 802 selects a node creator 808 from the node creator collection 806 based upon metadata specified by the mapping description 804. In one example, mapping description 804 specifies a particular node creator 808 to employ to instantiate the node associated with the device. Node creation component 802 instantiates the selected node creator 808 to generate a node creator instance 810.

Turning to FIG. 9, a system 900 is depicted that facilities generation of a node within an extensible framework in accordance with various aspects. System 900 illustrates a final step of node creation and includes the node creation component 802, node creator 810, and mapping description 804 described above with respect to FIG. 8. In addition, system 900 includes a data object collection 902, a translator collection 906, and a connection collection 910. Data object collection 902 includes all data objects 904 that can be included in modules/nodes and are available to the framework. Similarly, translator collection 906 and connection collection 910 include all translators 908 and connections 912, respectively, which can be employed in the framework.

Mapping description 804 specifies particular data objects 904 to include in the node based upon the device specific information. In addition, the mapping description 804 specifies an appropriate translator 908 and connection 912 for each data object 904 to be included in the node. Node creator 810 selects one or more data objects 904, translators 908, and connections 912 indicated in the mapping description 804. Subsequently, node creator 810 instantiates a node 914 that includes at least one module 916. Module 916 includes a module ID 918 that contains module identification information. Module 916 also include a container 920 that retains a data object 922 corresponding to selected data object 904 from the data object collection 902. For example, data object 922 can be an instance of a data object type associated with the selected data object 904. In addition, node creator 810 instantiates a translator 924 and a connection 926 in node 914, wherein translator 924 corresponds to the selected translator 908 (e.g., translator 924 is an instance of a translator type associated with translator 908) and connection 926 corresponds to the selected connection 912 (e.g., connection 926 is an instance of a connection type associated with connection 912). Node creator 810 further couples the translator 924, data object 922, connection 926, and a data source 928 (e.g., the device) in order to enable transport of data between data object 922 and data source 928 via connection 926 and translator 924 as described above.

According to another aspect, the extensible framework 102 and various constructs associated therewith as described above can be implemented with an object-oriented technology such as the .NET framework. Various portions of the extensible framework (e.g., nodes, node creators, data objects, translators, connections, etc.) can be included within assemblies that are dynamically loaded as needed by the extensible framework and/or a host application. It is to be appreciated, however, that aspects described herein can be implemented with other technologies. For example, Java or another suitable object-oriented environment can be employed to implement the extensible framework.

Figure 10:
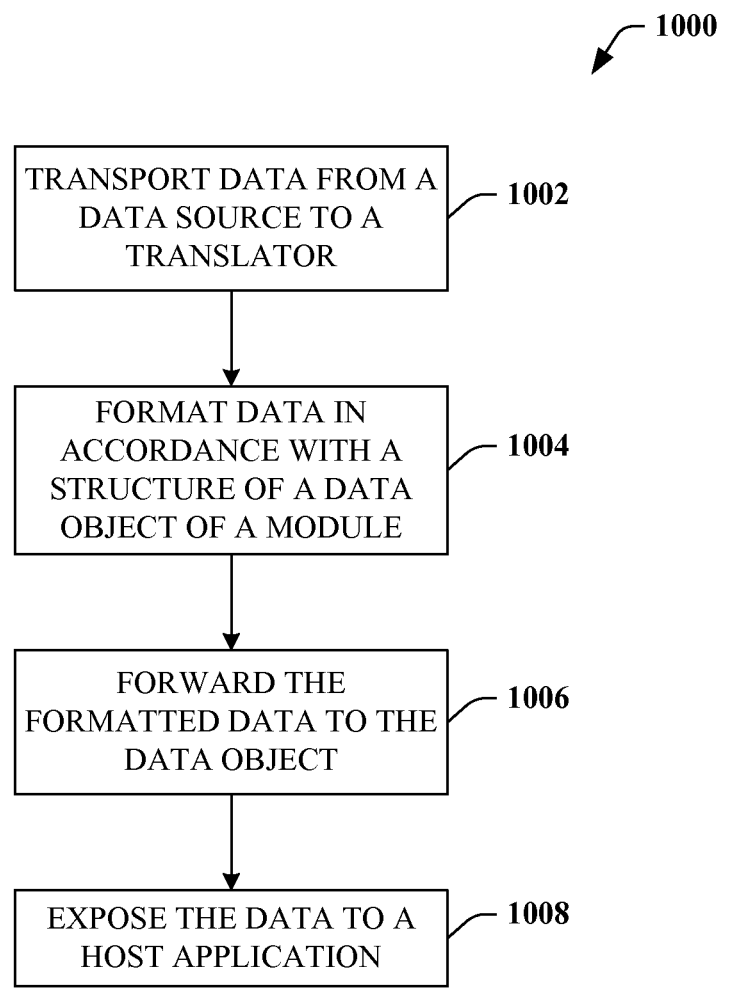
FIG. 10 illustrates a flow diagram of an example methodology for obtaining data from a data source in accordance with various aspects.
Figure 11:
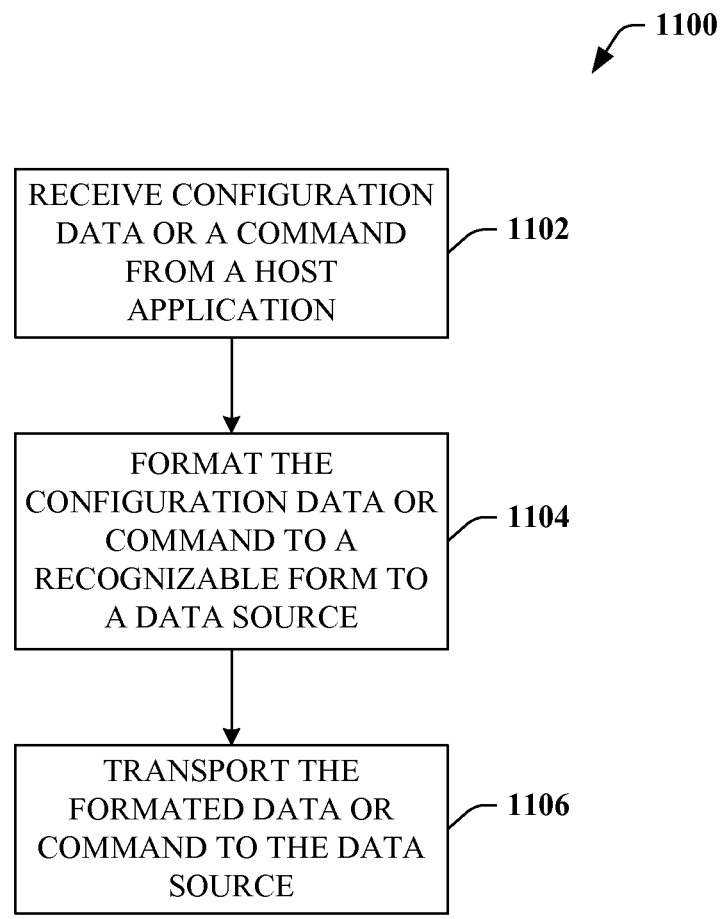
FIG. 11 illustrates a flow diagram of an example methodology for controlling a data source via an extensible framework.
Figure 12:
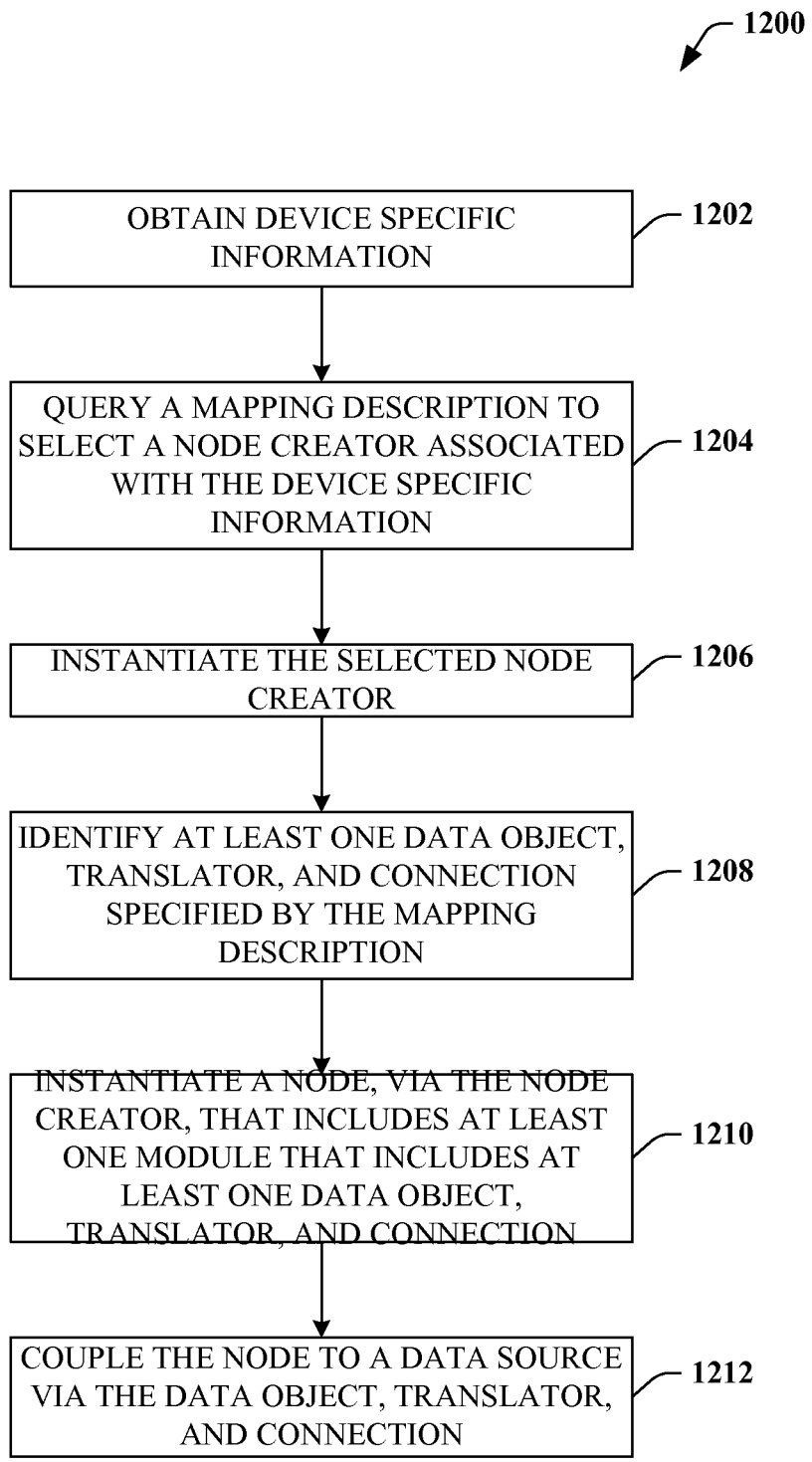
FIG. 12 illustrates a flow diagram of an example methodology for creating a representation of a device within an extensible framework in accordance with one or more aspects.

Referring to FIGS. 10-12, methodologies are described related to creating logical representations of devices in an extensible framework and employing the logical representations to interact with devices. While, for purposes of simplicity of explanation, the processes or methodologies are shown and described as a series or number of acts, it is to be understood and appreciated that the subject processes are not limited by the order of acts, as some acts may, in accordance with the subject processes, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject processes described herein.

Turning to FIG. 10, a method 1000 for obtaining data from a data source is illustrated. In an aspect, method 1000 can be employed by an extensible framework such as extensible framework 102. At 1002, data is transported from a data source to a translator. The data source can be a device represented in the extensible framework. For instance, the data source can be a physical device in an industrial automation environment such as, but not limited to a controller, a sensor, a drive, a field device, a gateway, an I/O module, or the like. At 1004, data is formatted, at the translator, in accordance with a structure of a data object of a module. The module can be a logical representation of a device and/or a portion of a composite device within the extensible framework. Further, the data object in the module can represent functions, features, programs, data objects, inputs, outputs, etc. of the device represented by the module. Moreover, the data formatted at the translator can be associated with the particular function, feature, program, etc. of the device and for which the data object represents. At 1006, the formatted data is forwarded to the data object. In an aspect, the data object can retain the formatted data within the extensible framework. At 1008, the data is exposed to a host application or other entity utilizing the extensible framework.

FIG. 11 illustrates a method 1100 for controlling a data source via an extensible framework. In an aspect, method 1100 can be employed by an extensible framework such as extensible framework 102. At 1102, configuration data or a command is received from a host application. The configuration data can include a value for a parameter of a device, an input for the device, etc. The command can relate to a call to execute or halt a particular program, function, or operation of the device. At 1104, the configuration data or command is formatted to a recognizable form to a data source. The data source can be the device for which the configuration data or command is intended. At 1106, the formatted data or command is transported to the data source.

Referring now to FIG. 12, illustrated is a method 1200 for creating a representation of a device within an extensible framework in accordance with one or more aspects. At 1202, device specific information is obtained. At 1204, a mapping description is queried with the device specific information to select a node creator associated with a device indicated in the device specific information. At 1206, the selected node creator is instantiated. At 1208, at least one data object, translator, and connection are identified, wherein the identified data objects, translators, and connections are specified by the mapping description. At 1210, a node is instantiated via the node creator. In an aspect, the node includes at least one module that includes at least one data object, translator, and connection identified in the mapping description. At 1212, the node is coupled to a data source via the data object, translator, and connection.

Figure 13:
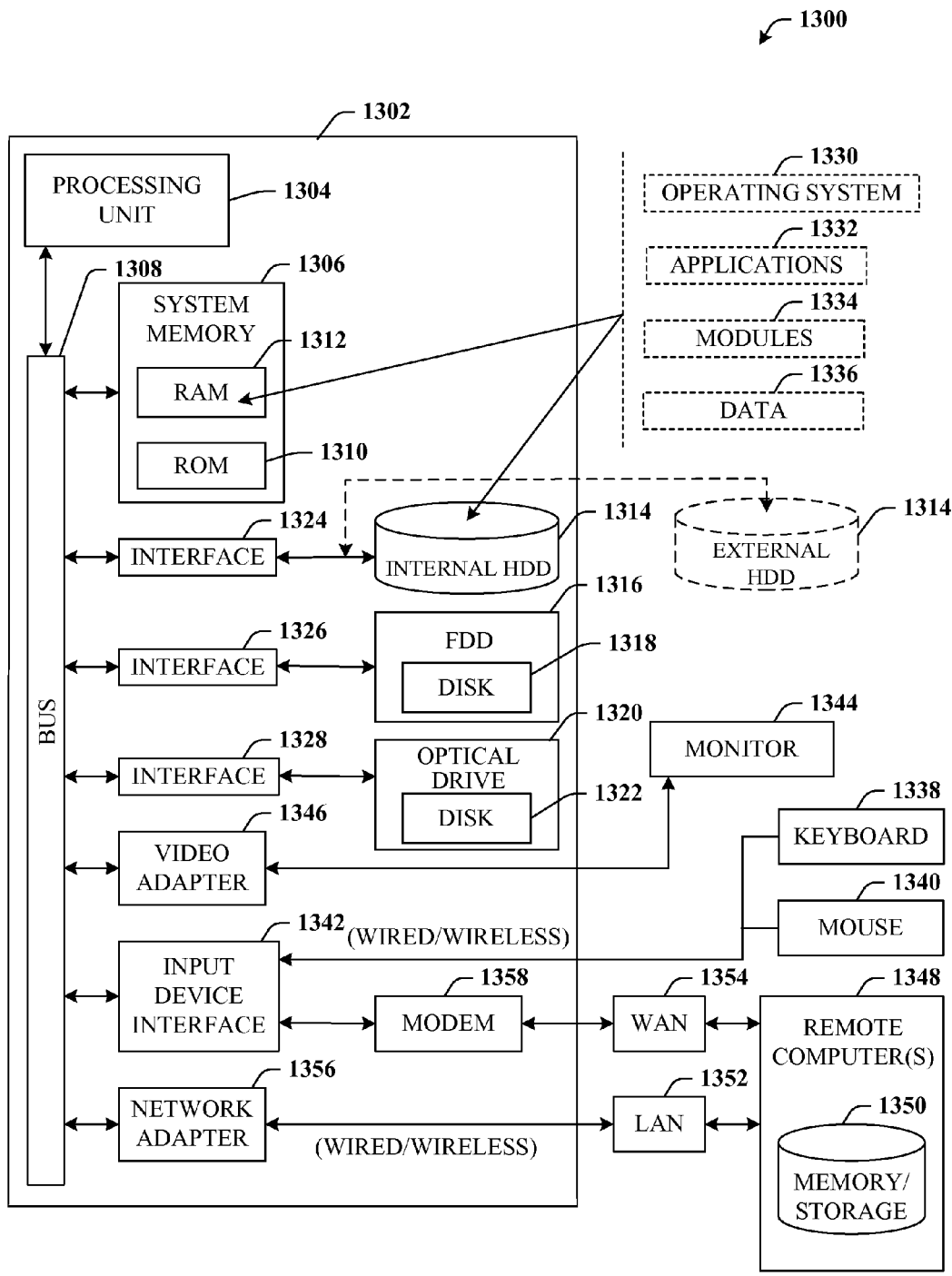
FIG. 13 illustrates a block diagram of a computer operable to execute the disclosed aspects.

In order to provide additional context for implementing various aspects of the claimed subject matter, FIG. 13 and the following discussion is intended to provide a brief, general description of a suitable computing environment in which the various aspects of the subject innovation may be implemented. For example, the host application as well as the extensible framework can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Generally, program modules include routines, programs, components, data structures, etc., that perform particular tasks or implement particular abstract data types. Moreover, those skilled in the art will appreciate that the claimed subject matter can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 13, an exemplary environment 1300 for implementing various aspects described herein includes a computer 1302, the computer 1302 including a processing unit 1304, a system memory 1306 and a system bus 1308. The system bus 1308 couples to system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a non-volatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 may also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE-1394 interface technologies. Other external drive connection technologies are within contemplation of the subject disclosure.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is appreciated that the claimed subject matter can be implemented with various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, a serial port, an IEEE-1394 port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers, etc.

The computer 1302 may operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which may connect to a global communications network, e.g., the Internet.

When used in a LAN networking environment, the computer 1302 is connected to the local network 1352 through a wired and/or wireless communication network interface or adapter 1356. The adapter 1356 may facilitate wired or wireless communication to the LAN 1352, which may also include a wireless access point disposed thereon for communicating with the wireless adapter 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, is a wireless technology similar to that used in a cell phone that enables a device to send and receive data anywhere within the range of a base station. Wi-Fi networks use IEEE-802.11 (a, b, g, etc.) radio technologies to provide secure, reliable, and fast wireless connectivity. A Wi-Fi network can be used to connect computers to each other, to the Internet, and to wired networks (which use IEEE-802.3 or Ethernet). Wi-Fi networks operate in the unlicensed 2.4 and 5 GHz radio bands, at an 13 Mbps (802.11a) or 54 Mbps (802.11b) data rate, for example, or with products that contain both bands (dual band). Thus, networks using Wi-Fi wireless technology can provide real-world performance similar to a 10BaseT wired Ethernet network.

As utilized herein, terms "component," "system," "creator," "module," "node," "framework," "application," "translator," and the like, are intended to refer to a computer-related entity or solid-state electronic, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers. In addition, a component can be hardware or solid state electronic such as an electronic circuit, a semiconductor device, etc.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system, comprising:
a memory, communicatively coupled to a processor, the memory having stored therein instructions executable by the processor, comprising:
an extensible framework, comprising:
a plurality of modules, wherein respective modules represent devices in an industrial automation environment, and each module comprises a plurality of data objects respectively associated with sub-components of the devices;
a plurality of translators respectively configured to translate data between an associated data object and an associated sub-component;
a plurality of connections configured to enable communication between the data objects and translators;
a mapping component configured to generate respective mapping descriptions for modules of the plurality of modules, wherein each mapping description for each module comprises for each data object:
a first identification of an association between the data object and a sub-component,
a second identification of a translator to employ between the data object and the sub-component, and
a third identification of a connection to employ between the data object and the translator;

a node creation component configured to:
obtain a mapping description associated with a module representative of a device;
instantiate a node configured to represent the device comprising data objects based on the module;
for each data object in the node, couple the data object to the connection, the connection to the translator, and the translator to the associated sub-component based on the mapping description.

2. The system of claim 1, wherein at least one sub-component is a physical component.

3. The system of claim 1, wherein at least one sub-component is a data source.

4. The system of claim 3, wherein the device includes at least one of a controller, a field device, a sensor, a drive, or an I/O module.

5. The system of claim 1, wherein the module includes module identification information, wherein the module identification information includes at least one of a device type, a revision number, or a name.

6. The system of claim 1, wherein at least one sub-component is a virtual device.

7. The system of claim 1, wherein the modules are organized into a hierarchy representative of a hierarchy of the devices.

8. The system of claim 1, wherein a translator stores formatted data in a data object.

9. The system of claim 1, wherein the device is a physical device.

10. The system of claim 1, wherein the connection employs a network connection via at least one of a physical wire, an Ethernet medium, a fiber optic medium, or a wireless communications channel.

11. The system of claim 1, wherein the extensible network facilitates interaction between a host application and the device through the node instantiated for the device.

12. The system of claim 11, wherein the node exposes functions employable by the host application to interact with the sub-components through the data objects.

13. The system of claim 1, wherein at least one connection is employable between at least one of a plurality of data objects or a plurality of translators.

14. The system of claim 1, wherein the node creation component is further configured to:
select the data object,
the translator, and
the connection in accordance with the mapping description.

15. A method, comprising:
generating by a system including a processor, a plurality of modules, wherein respective modules represent devices in an industrial automation environment, and each module comprises a plurality of data objects respectively associated with sub-components of the devices;
generating, by the system, a plurality of translators respectively configured to translate data between an associated data object and an associated sub-component;
generating, by the system, a plurality of connections configured to enable communication between the data objects and translators;
generating, by the system, respective mapping descriptions for modules of the plurality of modules, wherein each mapping description for each module comprises for each data object:
a first identification of an association between the data object and a sub-component,
a second identification of a translator to employ between the data object and the sub-component, and
a third identification of a connection to employ between the data object and the translator;
obtaining, by the system, device specific information associated with a device;
obtaining, by the system based upon the device specific information, a mapping description associated with a module representative of the device;
instantiating, by the system, a node representing the device based on the module; and
for each data object in the node, coupling, by the system, the data object to the connection, the connection to the translator, and the translator to the associated subcomponent based on the mapping description.

16. The method of claim 15, wherein at least one sub-component is a physical component.

17. The method of claim 16, wherein at least one sub-component is a virtual device.

18. The method of claim 15, further comprising exposing, by the system via the node, functions employable by a host application to interact with the subcomponents through the data objects.

19. A non-transitory computer-readable medium having instructions stored thereon that, in response to execution, cause a system including a processor to perform operations comprising:
generating a plurality of modules, wherein respective modules represent devices in an industrial automation environment, and each module comprises a plurality of data objects respectively associated with sub-components of the devices;
generating a plurality of translators respectively configured to translate data between an associated data object and an associated sub-component;
generating a plurality of connections configured to enable communication between the data objects and translators;
generating respective mapping descriptions for modules of the plurality of modules, wherein each mapping description for each module comprises for each data object:
a first identification of an association between the data object and a subcomponent,
a second identification of a translator to employ between the data object and the subcomponent, and
a third identification of a connection to employ between the data object and the translator;
obtaining device specific information associated with a device; and
obtaining. based upon the device specific information, a mapping description associated with a module representative of the device;
instantiating a node representing the device based on the module; and
for each data object in the node, coupling the data object to the connection, the connection to the translator, and the translator to the associated subcomponent based on the mapping description.

20. The non-transitory computer-readable medium of claim 19, the operations further comprising exposing, via the node, functions employable by a host application to interact with the subcomponents through the data objects.

* * * * *